United States Patent [19]

Ross

[11] Patent Number: 4,751,667
[45] Date of Patent: Jun. 14, 1988

[54] METHOD AND APPARATUS FOR VERIFYING THE IDENTITY OF DYNAMIC MEMORY

[75] Inventor: Stephen R. Ross, Chorleywood, England

[73] Assignee: National Research Development Corporation, United Kingdom

[21] Appl. No.: 859,312

[22] Filed: May 5, 1986

[30] Foreign Application Priority Data

May 11, 1985 [GB] United Kingdom ............... 8511995

[51] Int. Cl.$^4$ .......................................... G01R 31/28
[52] U.S. Cl. ................................. 364/900; 371/25
[58] Field of Search ................... 371/21, 25, 13; 364/200, 900; 365/201, 222

[56] References Cited

U.S. PATENT DOCUMENTS

| 4,245,308 | 1/1981 | Hirschman et al. | 364/200 |
| 4,337,659 | 7/1982 | Ragle | 364/900 X |
| 4,380,070 | 4/1983 | Steiner | 371/20 |
| 4,462,076 | 7/1984 | Smith, III | 364/200 |
| 4,486,828 | 12/1984 | Kitamura et al. | 364/200 |
| 4,622,652 | 11/1986 | Zumchak et al. | 364/900 |

FOREIGN PATENT DOCUMENTS

| 2131580 | 1/1984 | United Kingdom . |
| 2142765 | 4/1985 | United Kingdom . |
| 2145856 | 4/1985 | United Kingdom . |

Primary Examiner—Charles E. Atkinson
Attorney, Agent, or Firm—Nixon & Vanderhye

[57] ABSTRACT

The refresh cycle for a bank of dynamic memory is inhibited until a predetermined proportion of the data has corrupted. The pattern of cells in which data has corrupted is characteristic of the individual device and is used to determine whether the individual machine is authorized to run protected software.

6 Claims, 1 Drawing Sheet

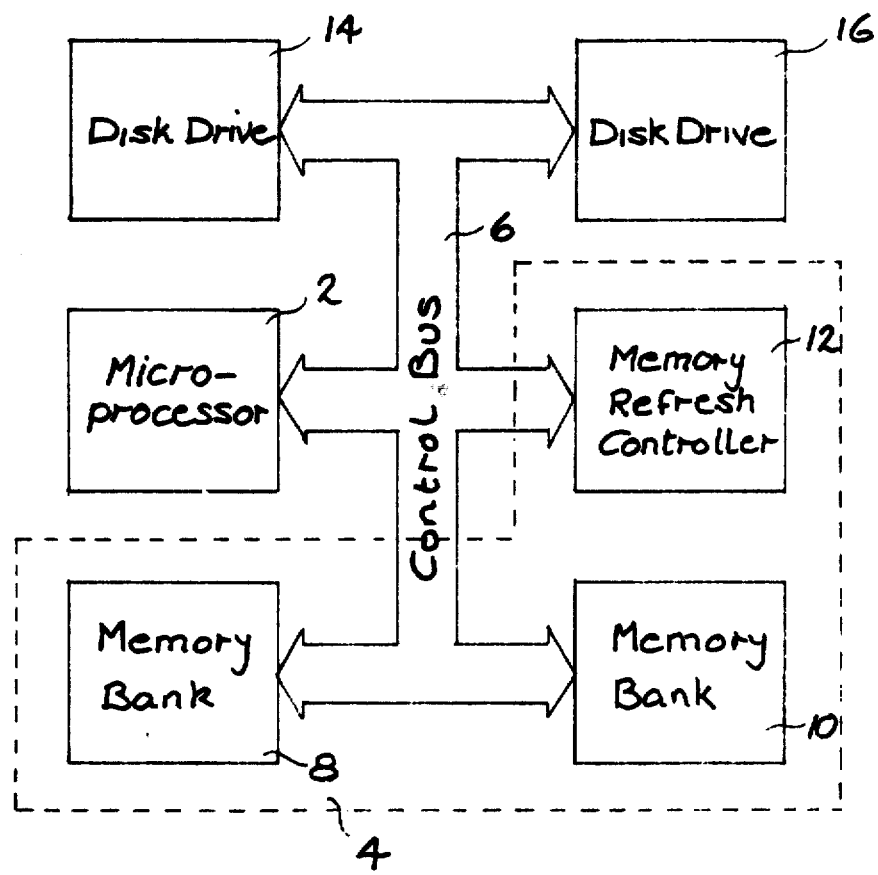

METHOD AND APPARATUS FOR VERIFYING THE IDENTITY OF DYNAMIC MEMORY

FIELD OF THE INVENTION

This invention relates to a method and apparatus for verifying the identity of dynamic memory and is useful for the protection of software.

BACKGROUND OF THE INVENTION

As the cost of hardware steadily diminishes, the cost of developing software to run on stored program controlled machines, e.g. computers becomes increasingly significant. A well recognised problem is caused by the relative ease with which software, once developed, can be copied say from one magnetic disk to another. It is not uncommon for users to provide one another with copies of software, so depriving the software house of a sale, or worse for so called pirates to illicitly copy someone elses software for sale. The attractions of that are obvious in that profit can be made with no expenditure on design and development of the pirated software.

One attempted solution to the problem was the copy protected disk. The floppy disk is protected in such a way that it cannot be copied. That is all very well except that there is no distinction between copying by authorised users and illicit copying. The authorised user may want to make copies for several reasons, but the problem is really acute when the user has a hard disk drive. Here the user would expect to transfer bought software from floppy disk to the hard disk storage. With a copy protected disk that cannot be done. So the poor user has to load the software from floppy disk into memory each time it is to be used, which rather detracts from the usefulness of the hard disk drive.

SUMMARY OF THE INVENTION

This problem is overcome by the invention in relation to hardware utilising dynamic memory.

In accordance with the invention, there is provided a method for verifying the identity of a dynamic memory which requires refreshing periodically in order to maintain data stored therein uncorrupted, the method comprising: inhibiting refreshing of the memory until a predetermined proportion of the data stored in the memory has corrupted, reading the corrupted data and comparing the data pattern as read, with an expected data pattern.

Normally, dynamic memory is refreshed periodically in order to prevent the data stored therein from corrupting. I have discovered that if the refresh cycle is inhibited so that the data does become corrupted, the way in which it corrupts is characteristic of the individual memory device or devices which constitute the memory. That is to say, no two devices, even of the same type, behave in precisely the same way.

In accordance with the invention there is also provided apparatus for verifying the identity of a dynamic memory which requires refreshing periodically in order to maintain data stored therein uncorrupted, the apparatus comprising: data processing means and storage means containing instructions for the data processing means, the apparatus being connected to the dynamic memory for controlling reading, writing and refreshing thereof, the instructions defining a configuration of the processing means to inhibit refreshing of the memory until a predetermined proportion of the data stored in the memory has corrupted, to read the corrupted data and to compare the data pattern as read, with an expected data pattern.

In a semiconductor dynamic memory, data is stored within a cell as a charge or the absence thereof, on a capacitor (either a real or a parasitic capacitor). When the refresh cycle is inhibited, eventually all the storage cells in which the capacitor was charged, lose their charge. Some cells, however, lose their charge more rapidly than others.

The invention relies on the discovery that the order in which a device's cells lose their charge is fairly consistent, so that at some particular intermediate stage before all the cells have become discharged, the pattern of cells in which the data has corrupted is characteristic of the individual device.

It is thought that the earlier corruption of some cells is caused by impurities and faults in the crystal structure of the semiconductor material. Since no two devices will have the same pattern of impurities and faults, each is identifiable with a fair degree of certainty by the pattern in which its cells lose their charge when the refresh cycle is inhibited.

The use of this in the protection of software is that the software can include a routine to check that it is running on an authorised machine and if not to abort. This allows the user to copy from floppy disk to hard disk, but if the machine does not identify its dynamic memory correctly, the software will abort.

BRIEF DESCRIPTION OF THE DRAWING

The single FIGURE is a schematic representation of a microcomputer in which the invention can be used.

DETAILED DESCRIPTION

The microcomputer shown in the drawing comprises a microprocessor 2 and a memory unit 4 interconnected by a control bus 6. The memory unit 4 comprises two memory banks 8 and 10, which, in the example illustrated are each individual semiconductor memory chips. The microcomputer also includes a memory refresh controller 12, which may be physically separate from the processor 2, as illustrated, or in some cases is incorporated in the microprocessor chip. There may be other memory banks (not shown). At least one of the memory banks, illustratively bank 10, is a dynamic memory requiring refreshing periodically to prevent the data stored therein from corrupting. Refresh for the bank 10, and for the bank 8 if that is also dynamic, is controlled by the refresh controller 12.

In order to identify the individual device or devices constituting the memory bank 10, the memory refresh controller is arranged to inhibit refreshing of the dynamic memory.

Software to be protected contains a test routine which when the software is run, loads into memory bank 8. If this bank is dynamic, it requires refreshing, even though the refresh circuit has been inhibited, in order not to corrupt the software. Reading a dynamic memory at location, say, row x column y, has the effect of refreshing all of the memory cells located in row x. The routine in the memory bank 8 is therefore arranged to read sufficient locations of the bank 8 sufficiently frequently, to keep the data stored therein uncorrupted. If the banks 8 and 10 are on the same physical chip, then that part of the memory containing the test routine is refreshed by reading, as described above, while the rest of the memory is allowed to corrupt.

The test routine first instructs the processor to write predetermined data into memory bank 10. The data could be all 1's or all 0's for example. The routine then instructs the processor 2 to send control signals over the bus 6 to which the refresh controller is responsive to inhibit refreshing of the dynamic memory.

After a predetermined period the routine instructs the processor to read a first section of the memory bank 10 to determine how much data has been corrupted. In the case where all 1's had been written into bank 10 the processor would merely count the number of 0's it read. The processor is then instructed to compare the number of corrupted data with a predetermined value. In a preferred example, the value corresponds to 10% of the total number of cells in the memory bank section 10.

Successive sections of the bank 10 are read periodically until the predetermined value is reached. One particular final section of the memory bank 10 is then read.

If this is the first time the software has been run, the corrupted data so read, is written to the floppy disk from which the protected software was loaded. Subsequently when the software is loaded from the disk, the corrupted data is written into memory bank 8. When in such subsequent use of the software, the corrupted data is read from the final section of the memory bank 10, it is compared with the stored initial corrupted data. If there is a sufficiently good correlation there is a good indication that the memory bank 10 is the same individual one as was present on the first run of the software, and the software is allowed to run. If there is insufficient correlation, there is a good indication that the memory bank 10 is a different individual memory bank and the software aborts.

It is usual for a logical 1 to be stored in about half of the cells of the memory as the presence of a charge on the cell's capacitor and, in the other half of the cells as the absence of charge. It does not matter, therefore, whether it is a pattern of all 1's or all 0's which is initially written into the memory bank 10.

The early cells to lose their charge are believed to be caused to do so by the presence in the semiconductor material of impurities and/or faults. These impurities and faults are different for each individual device and can thus be used to distinguish one individual device from another. Later cells to become discharged are believed to do so as a result of their positions in the physical structure of the device. Such cells are more characteristic of the type of device and cannot be used to distinguish individuals devices. Eventually all the cells lose their charge.

The level of 10% cells containing corrupted data, which actually represents 20% of the cells which could corrupt, is found to be about optimum for cells which are useful to characterise the individual device. Useful results are obtained from an example in which the final section of memory, from which the data to characterise the memory is read, is about 1000 cells so that there are about 100 corrupted data.

The initial pattern of corrupted data can either be stored as such for comparison with the corrupted data read in later runs of the software or, in an alternative, the addresses of the corrupted data can be stored.

An alternative proposed for obtaining a controlled proportion of the data corrupted, is merely to read the data after a predetermined time. However, as the rate at which cells lose their charge depends on temperature, some form of temperature compensation or control would have to be provided.

In some instances where repetitive tasks are performed dynamic memory is read sufficiently frequently for there to be no other means of refresh provided. This is the case with some computers which use dynamic memory for the video display unit. The process of reading the memory to provide the display is sufficiently frequent to keep the data uncorrupted. The refreshing of this memory can therefore be inhibited by inhibiting the video display control unit (not shown) from reading the dynamic memory used for the video display unit. Although this has the disadvantage that the video display is interrupted, there is a compensating advantage that the program memory is not required to corrupt.

The method of the invention can be practiced using either copy protected disks or non-copy protected disks.

In the case of a copy protected disk, the disk contains three programs:

1. an application program (e.g. a wordprocessor or database) which is encrypted so that it cannot be executed directly;

2. an installation program which is used to produce a version of the application program to run on a specific machine; and 3. an authorisation program which, in use, is run before the application program, to check that the machine on which the program is running is the original machine on which the software was installed.

A copy protected disk cannot be duplicated using normal disk copy programs, and has reserved areas which are altered to indicate that the disk has been used to create working copies of the application program.

The application program is installed as follows:

The user inserts the copy protected disk and a disk on which the working version of the program is to be written into respective disk drives 14 and 16.

The installation program is run. This first runs the test routine described above to obtain the corrupted data pattern. The installation program next decrypts the application program and inserts the corrupted data pattern in the application program which is written to the working disk.

The installation program checks that a working version of the application program has been created on the working disk and then marks the copy protected disk to prevent it being used to create additional copies.

The user can then make back up copies of the now executable program from the working disk. The working copy of the application program can be made on hard disk instead of floppy disk. Back up copies can also be taken from the hard disk.

The copy protected disk is only required for installation. However, the program can only be installed on machines whose disk drives are compatible with the copy protection scheme.

When a working copy of the application program is run, it first executes the test routine to check that the corrupted data pattern from the machine it is running on is sufficiently well correlated with the corrupted data pattern which was written into the application program during installation. Only then does the program execution continue to the main body of the execution program.

The method of the invention is used a little differently if the disc is not copy protected. If the procedure described above were used for non copy protected disks, any number of copies could be installed on any number of machines. Although each such copy could only be executed by the machine it was installed on, the number of copies which could be installed would be unlimited.

It is therefore necessary to use a procedure to check the authority of the user to install copies. After the installation program has executed the test routine to obtain the corrupted data pattern, the installation program uses the corrupted data pattern to calculate an identity code, say, a 12 digit number. This is encrypted and displayed by the computer, say on its screen. The user then communicates the number to the vendor of the software, for example by telephone, together with other information such as the serial number of the software and where it was bought, to enable the vendor to ascertain that the user is authorised. If the user is authorised, the identity code is decrypted and the decrypted identity code is returned to the user to serve as an authorisation code. The authorisation code is entered into the computer by the user. The installation program compares the authorisation code with the original unencrypted identity. If they are the same the installation program proceeds with the decryption of the application program to produce a working copy, as before, containing the corrupted data pattern and the authorisation routine.

Although this system has the disadvantage that the vendor must be contacted during installation, there is the advantage that protection can be applied to machines which are not physically compatible with the distribution medium of the original software. Thus the application program files can be copied from the dealer's computer which might have 5 inch disks to the user's computer which might have 3 inch disks.

I claim:

1. A method for verifying the identity of a dynamic memory which requires refreshing periodically in order to maintain data stored therein uncorrupted, the method comprising: inhibiting refreshing of the memory until a predetermined proportion of the data stored in the memory has corrupted, reading the corrupted data and comparing the data pattern as read, with an expected data pattern.

2. A method as claimed in claim 1, including writing the same data into each location of the memory before inhibiting the refreshing thereof.

3. A method as claimed in claim 1 or 2, wherein the proportion of the data which has corrupted is monitored by periodically determining the proportion of data that has corrupted in a section of memory.

4. A method as claimed in claim 1 or 2, wherein the predetermined proportion is 10%.

5. Apparatus for verifying the identity of a dynamic memory which requires refreshing periodically in order to maintain data stored therein uncorrupted, the apparatus comprising: means arranged to inhibit refreshing of the memory until a predetermined proportion of the data stored in the memory has corrupted, means arranged to read the corrupted data and means arranged to compare the data pattern as read with an expected data pattern.

6. Apparatus for verifying the identity of a dynamic memory which requires refreshing periodically in order to maintain data stored therein uncorrupted, the apparatus comprising: data processing means and storage means containing instructions for the data processing means, the apparatus being connected to the dynamic memory for controlling reading, writing and refreshing thereof, the instructions defining a configuration of the processing means to inhibit refreshing of the memory until a predetermined proportion of the data stored in the memory has corrupted, to read the corrupted data and to compare the data pattern as read, with an expected data pattern.

* * * * *